(12) United States Patent
Wittig (10) Patent No.: US 6,339,420 B2
(45) Date of Patent: Jan. 15, 2002

(54) ACTUATION DEVICE HAVING MULTIPLE DEGREES OF FREEDOM OF MOVEMENT AND REDUCED INERTIA

(76) Inventor: Michael B. Wittig, 355 Mariposa Ave., #5, Mountain View, CA (US) 94041

( * ) Notice: Subject to any disclaimer, the term of this patent is extended or adjusted under 35 U.S.C. 154(b) by 0 days.

(21) Appl. No.: 09/770,973

(22) Filed: Jan. 25, 2001

Related U.S. Application Data (60) Provisional application No. 60/178,074, filed on Jan. 25, 2000, provisional application No. 60/178,144, filed on Jan. 26, 2000, and provisional application No. 60/178,841, filed on Jan. 27, 2000.

(51) Int. Cl.[7] .............................................. G09G 5/00
(52) U.S. Cl. ..................... 345/156; 345/161; 345/701; 463/38
(58) Field of Search ................................. 345/156, 161, 345/163, 157, 701, 702; 463/30, 38

(56) References Cited

U.S. PATENT DOCUMENTS

| 5,898,599 | A | | 4/1999 | Massie et al. ............... 364/578 |
|---|---|---|---|---|
| 6,184,868 | B1 | * | 2/2001 | Shahoian et al. ........... 345/161 |
| 6,211,848 | B1 | * | 4/2001 | Plesniak et al. ............... 345/1 |
| 6,219,589 | B1 | * | 4/2001 | Faraz et al. .................. 700/254 |
| 6,271,833 | B1 | * | 8/2001 | Rosenberg et al. ......... 345/161 |
| 6,278,439 | B1 | * | 8/2001 | Rosenberg et al. ......... 345/157 |

* cited by examiner

Primary Examiner—Kent Chang (57) ABSTRACT

According to one aspect of the invention an actuation device is provided which includes a support frame first, second, third, and fourth linkages, a user interface component, and a first rotation actuator. Each linkage has first and second spaced apart portions. The first portions of the first and second linkages are secured to the support frame for pivotal movement about first and second spaced apart axes, respectively, and for rotational movement about a common first rotation axis transverse to the first and second pivot axes. The first portions of the third and fourth linkages are secured to the second portions of the first and second linkages for pivotal movement about third and fourth pivot axes, respectively. The second portions of the third and fourth linkages are secured to one another for pivotal movement about a fifth pivot axis. The user interface component is secured to the second portion of one of the third linkage and the fourth linkage. The user interface component has a surface shaped for contact by a body part of a person. The rotation actuator has a first rotation actuator body and a first rotation actuating component secured to the first rotation actuator body and is actuable to move relative to the first rotation actuator body. The first rotation actuator is connected between the frame and the first linkage such that movement of the first rotation actuating component causes rotation of the first, second, third and fourth linkages about the first rotation axis.

18 Claims, 6 Drawing Sheets

ACTUATION DEVICE HAVING MULTIPLE DEGREES OF FREEDOM OF MOVEMENT AND REDUCED INERTIA

CROSS-REFERENCE TO RELATED APPLICATIONS

Priority is claimed from Provisional Application Nos. 60/178,074, filed on Jan. 25, 2000, Ser. No. 60/178,144, filed on Jan. 26, 2000, and Ser. No. 60/178,841, filed on Jan. 27, 2000.

BACKGROUND OF THE INVENTION

1). Field of the Invention

This invention relates to an actuation device of the kind used for interactive games.

2). Discussion of Related Art

Actuation devices are often used in, for example, interactive games. Forces are imparted to a hand of a person by a handle held in the hand of the person. The degrees of freedom of movement of such a handle are usually relatively limited. Such a device usually includes relatively heavy motors which move together with the linkage mechanism of the device, resulting in large amounts of inertia. The motors used on such devices are also usually of the kind that exerts relatively small forces, so as to prevent injury to the person.

SUMMARY OF THE INVENTION

According to one aspect of the invention an actuation device is provided which includes a support frame first, second, third, and fourth linkages, a user interface component, and a first rotation actuator. Each linkage has first and second spaced apart portions. The first portions of the first and second linkages are secured to the support frame for pivotal movement about first and second spaced apart axes, respectively, and for rotational movement about a common first rotation axis transverse to the first and second pivot axes. The first portions of the third and fourth linkages are secured to the second portions of the first and second linkages for pivotal movement about third and fourth pivot axes, respectively. The second portions of the third and fourth linkages are secured to one another for pivotal movement about a fifth pivot axis. The user interface component is secured to the second portion of one of the third linkage and the fourth linkage. The user interface component has a surface shaped for contact by a body part of a person. The rotation actuator has a first rotation actuator body and a first rotation actuating component secured to the first rotation actuator body and is actuable to move relative to the first rotation actuator body. The first rotation actuator is connected between the frame and the first linkage such that movement of the first rotation actuating component causes rotation of the first, second, third and fourth linkages about the first rotation axis.

According to another aspect of the invention, an actuation device is provided which includes a support frame, first, second, third, and fourth linkages, a user interface component, and a first pivoting actuator. Each linkage has first and second spaced apart portions. The first portions of the first and second linkages are secured to the support frame for pivotal movement about first and second pivot axes, respectively. The third and fourth linkages are secured to the second portions of the first and second linkages for pivotal movement about third and fourth pivot axes, respectively. The second portions of the third and fourth linkages are secured to one another for pivotal movement about a fifth pivot axis. The user interface component is secured to the second portion of one of the third linkage of the fourth linkage. The user interface component has a surface shaped for contact by a body part of a person. The first pivoting actuator has a first pivoting actuator body and a first pivoting actuating component secured to the first pivoting actuator body. The first pivoting actuating component has lower mass than the first pivoting actuator body. The first pivoting actuating component is actuable to move relative to the first pivoting actuator body. The first pivoting actuator body is secured to the frame and the first pivoting actuating component is secured to the first linkage such that movement of the first pivoting actuating component causes pivoting of the first linkage about the first pivot axis.

According to a further aspect of the invention an actuation device is provided which includes a support frame, a linkage mechanism, a user interface component, an actuator, and a braking device. The linkage mechanism is secured to the support frame. The user interface component is secured to the linkage mechanism and has a surface shaped for contact by a body part of a person. The linkage mechanism allows for movement of the user interface component in at least one direction relative to the frame. The actuator has an actuating component secured to the actuator body. The actuating component is actuable to move relative to the actuator body. The actuator is connected between two components of the frame and linkage mechanism such that movement of the actuating component causes movement of the linkage mechanism so as to move the user interface device. The braking device has a braking device body and a braking component secured to the braking device body. The braking component is moveable relative to the braking device body. Movement of the braking component is controllable so as to vary a resistance to be overcome to move the braking component relative to the braking device body. The braking device is connected between two components of the frame and the linkage mechanism such that an increase of the resistance brakes the movement of the linkage mechanism imparted by the actuation device.

According to a further aspect of the invention an electric motor is provided comprising a housing, a plurality of stator magnets, first and second actuator components, a link, and first and second electrical conductors. The actuator motors are secured to the housing and are located in at least two row arrangements. For each row arrangement odd magnets have north on a first side and south on a second side and even magnets have south on the first side and north on the second side. The arrangements have magnetic field lines forming in one direction across a first actuator gap from each odd magnet of the first arrangement to each odd magnet of the second arrangement and across a second actuator gap from each odd magnet of the second arrangement back to each odd magnet of the first arrangement, and in an opposing direction across the second actuator gap from each even magnet of the first arrangement to each even magnet of the second arrangement and across the first actuator gap from each even magnet of the second arrangement back to each even magnet of the first arrangement. The first and second actuator components are located in the first and second actuator gaps respectively. The link secures the actuator components to one another to form an actuator which is mounted to the housing for movement relative to the housing. The first and second electrical conductors are secured to the first and second actuator component respectively. The first conductor has a section located in the first actuator gap and extending transverse to the magnetic field lines so that a current therein causes movement thereof relative to the housing. The second conductor has a section located in the second actuator gap and extending transverse to the magnetic field lines so that a current therein causes movement thereof relative to the housing.

BRIEF DESCRIPTION OF THE DRAWINGS

The invention is further described by way of example with reference to the accompanying drawings wherein.

DETAILED DESCRIPTION OF THE INVENTION

Figure 1:
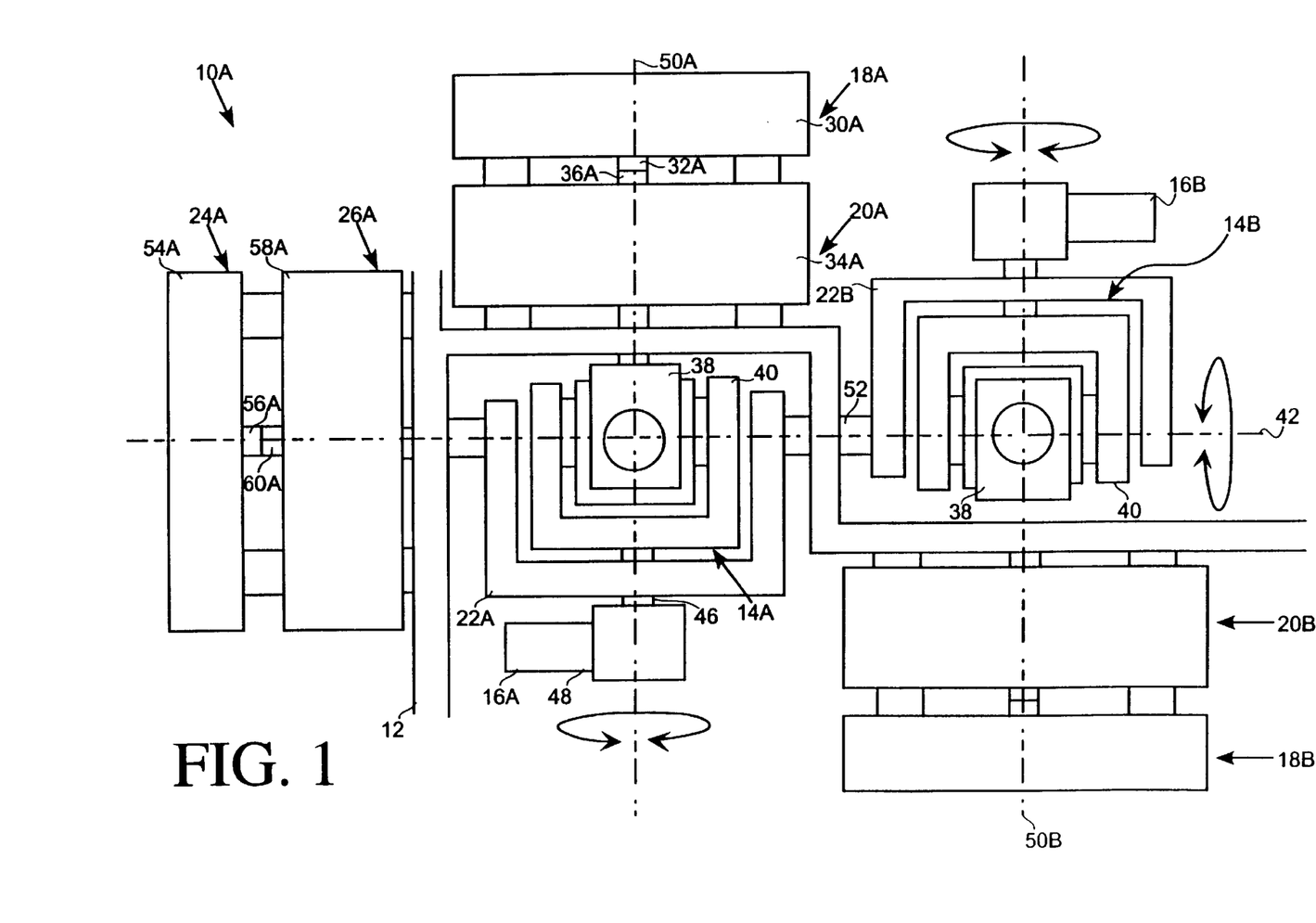
FIG. 1 is a front view of a subsystem of an actuation device according to an embodiment of the invention.

FIG. 1 of the accompanying drawings illustrates a first subsystem 10A of an actuation device, suitable for us in interactive games, according to an embodiment of the invention. The subsystem 10A includes a support frame 12, a first universal joint 14A, a second universal joint 14B, a first linkage 16A, a second linkage 16B, a first pivoting actuator motor 18A, a second pivoting actuator motor 18B, a first pivoting brake 20A, a second pivoting brake 20B, a first rotation bracket 22A, a second rotation bracket 22B, a first rotation actuator motor 24A, and a first rotation brake 26A.

The first pivoting actuator motor 18A has a first pivoting actuator body 30A, and a first pivoting actuating spindle 32A. The spindle 32A is rotatable relative to the body 30A and has lower mass than the body 30A.

The first pivoting brake 20A includes a first pivoting brake body 34A and a first pivoting brake shaft 36A. The shaft 36A extends through the body 34A and is rotatable relative to the body 34A. The shaft 36A has lower mass than the body 34A.

The body 34A is mounted to a portion of the frame 12 and the body 30A is mounted to the body 34A. The spindle 32A is coupled to the shaft 36A.

An opposing end of the shaft 36A extends through an opening in the frame 12 and is coupled to a first portion 38 of the first universal joint 14A. A second portion 40 of the universal joint 14A is secured to the first portion 38. The second portion 40 can rotate relative to the first portion 38 about a rotation axis 42 and about an axis normal to the paper and intersecting the rotation axis 42.

A pin 46 is mounted to a lower surface of the second portion 40 and a first portion 48 of the first linkage 16A is secured to the pin 46. The spindle 32A, the shaft 36A, the first and second portions 38 and 40, the pin 46, and the first linkage 16A all pivot about a vertical first pivot axis 50A. The second portion 40 together with the pin 46 and the first linkage 16A can also rotate relative to the frame 12 about the rotation axis 42. Such rotation results in a bend in the first pivot axis 50A at the rotation axis 42. As such, a lower portion of the first pivot axis 50A then extends at an angle relative to an upper portion of the first pivot axis 50A. As will be understood in the functioning of a universal joint, an orientation of the lower portion of the pivot axis 50A can be maintained even when the first linkage 16A is pivoted about the lower portion of the first pivot axis 50A.

The second pivoting actuator motor 18B, the second pivoting brake 20B, the second universal joint 14B, and the second linkage 16B have a similar construction. The motor 18B and the brake 20B are mounted to the frame 12 and the universal joint 14B and the second linkage 16B are rotated together with a spindle of the motor 18B and a shaft of the 20B about a second pivot axis 50B. The pivot axes 50A and 50B extend vertically and are spaced from one another. The universal joint 14B also allows for rotation of a second portion 40 of the universal joint 14B relative to a first portion 38 thereof about the rotation axis 42. The second linkage 16B rotates together with the second portion of the universal joint 14B about the rotation axis 42. Such rotation of the linkage 16B results in a bend of the second pivot axis 50B at the rotation axis 42. An orientation of an upper portion of the second pivot axis 50B can be maintained relative to an orientation of a lower portion of the second pivot axis 50B even when the second linkage 16B is pivoted about the upper portion of the second pivot axis 50B.

The brackets 22A and 22B are mounted to the frame 12 and are rotatable about the pivot axis 42. The bracket 22A is connected to the pin 46 so that, upon rotation of the bracket 22A, the pin 46 is rotated about the rotation axis 42. Rotation of the bracket 22A thereby causes rotation of the first linkage 16A about the rotation axis 42. The pin 46 fits in a bearing in the bracket 22A so that the bracket 22A does not interfere with pivoting of the pin 46 about the first pivot axis 50A.

Similarly, the bracket 22B is connected through a pin to the second portion 40 of the universal joint 14B and the second linkage 16B. Rotation of the bracket 22B causes rotation of the second linkage 16B about the rotation axis 42. The bracket 22B does not interfere with pivoting of the linkage 16B about the second pivot axis 50B.

The brackets 22A and 22B are connected to one another through a connection pin 52. Because of the connection between the brackets 22A and 22B, the brackets 22A and 22B rotate in unison about the rotation axis 42.

The first rotation actuator motor includes a first rotation actuator motor body 54A and a first rotation actuating spindle 56A. The first rotation brake 26A includes a first rotation brake body 58A and a first rotation brake shaft 60A. The body 58A is mounted to the frame 12. The body 54A is mounted to the body 58A and the spindle 56A is coupled to the shaft 60A. An opposing end of the shaft 60A is connected to the bracket 12A. The shafts 56A and 60A rotate about the rotation axis 42. The motor 24A is the same as the motor 18A and the motor 26A is the same as the motor 20A.

In use, the motor 18A can be operated to rotate the spindle 32A, thereby rotating the first linkage 16A about the first pivot axis 50A. The brake 20A can be operated to brake the shaft 36A, thereby braking pivoting movement of the first shaft 16A about the pivot axis 50A.

Similarly, the motor 18B can be used to pivot the second linkage 16B independently of the first linkage 16A about the second pivot axis 50B and the brake 20B can be used to brake pivoting movement of the second shaft 16B about the second pivot axis 50B.

Furthermore, the motor 54A can be operated to rotate the spindle 56A, thereby rotating the shaft 60A and the brackets 22A and 22B about the rotation axis 42. Rotation of the brackets 22A and 22B causes rotation of the linkages 16A and 16B in unison about the rotation axis 42.

Note that the relatively heavy body 30A remains stationary and only the spindle, having a lower mass, is rotated, thereby minimizing rotational inertia. Similarly, the relatively massive bodies of the motors 18B and 24A, and the brakes 20A, 20B, and 26A remain stationary while the much lower mass spindles of these motors and brakes pivot and rotate. (U.S. Pat. No. 5,625,576 discloses a system having moving bodies of motors).

Because a respective brake is used in combination with a respective motor, the motor can be of the kind that creates relatively small forces on the handle 100. Injury to a user can thereby be prevented. Nevertheless, the brake can be of the kind that can create relatively large braking forces without any danger of injury to the person. A motor that can generate such large braking forces would be relatively large and also create relatively large actuation forces which could injure a person. Because the brake can only oppose movement applied by a user for system feedback, and does not create movement itself, there is a much lower chance of injury even when using a very powerful brake.

Figure 2:
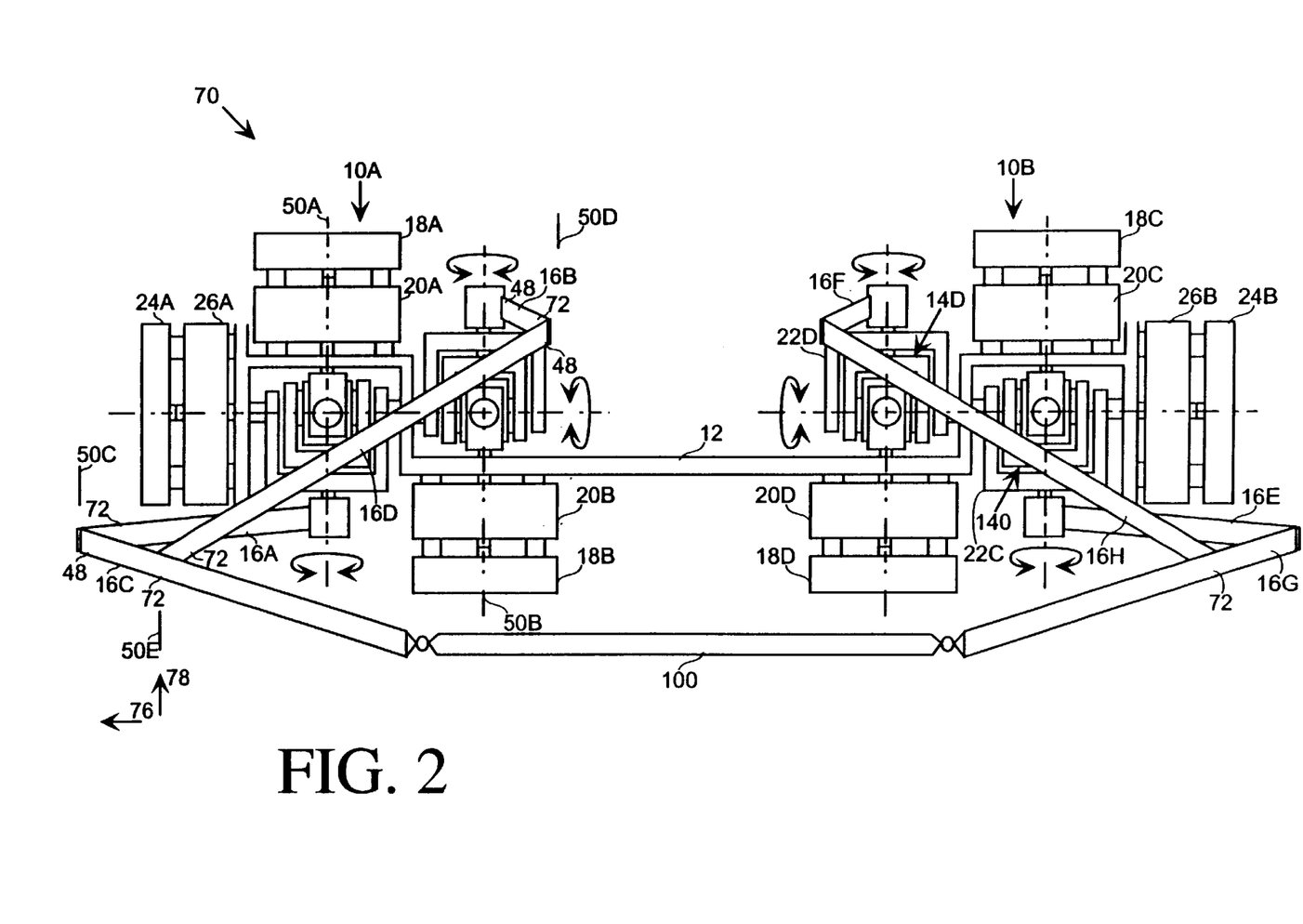
FIG. 2 is a front view of the actuation device.

FIG. 2 illustrates an actuation device 70 according to an embodiment of the invention, including the first subsystem 10A shown in FIG. 1 and a second subsystem 10B. The subsystems 10A and 10B utilize a common support frame 12. The subsystem 10B, as shown in FIG. 2, is a mirror image of the subsystem 10A.

Referring firstly to the first subsystem 10A, it further includes a third linkage 16C and a fourth linkage 16D. Each linkage 16A to D includes a respective first portion 48 and a respective second portion 72 spaced from the first portion 48 thereof. The first portion 48 of the third linkage 16C is pivotally connected to the second portion 72 of the first linkage 16A. The linkage 16C can pivot relative to the linkage 16A about a third pivot axis 50C. The first portion 48 of the fourth linkage 16D is pivotally secured to the second portion 72 of the second linkage 16B. The linkage 16B can pivot relative to the linkage 16B about a fourth vertical pivot axis 50D. The second portions 72 of the third and fourth linkages 16C and 16D are pivotally secured to one another. The third and fourth linkages can pivot relative to one another about a fifth vertical pivot axis.

In use, when viewed from above, clockwise rotation of the first and second linkages 16A and 16B causes movement of the second portion of the third linkage 16C in a direction 76. Counterclockwise rotation of the first linkage 16A and clockwise rotation of the second linkage 16B causes movement of the second portion 72 of the third linkage 16C out of the paper. When viewed from the left, counterclockwise rotation of the first and second linkages 16A and 16B causes movement of the second portions 72 of the third linkage 16C in an upward direction 78. The second portion 72 of the third linkage 16C can thus be moved in three dimensions.

The second subsystem 10B is a mirror image of the first subsystem 10A and includes a third universal joint 14C, a fourth universal joint 14D, first, second, third, and fourth linkages 16E, 16F, 16G, and 16H respectively, third and fourth pivoting actuator motors 18C and 18D respectively, third and fourth pivoting brakes 20C and 20D respectively, third and fourth rotation brackets 22C and 22D respectively, a second rotation actuator motor 24B, a second rotation brake 26B, all assembled in a manner similar to the components of the first subsystem 10A. The second subsystem 10B is also operable to move a second portion 72 of the seventh linkage 16G in three dimensions.

A handle 100 is pivotally secured to extensions of the second portions of the third and seventh linkages 16C and 16G. The handle 100 can pivot relative to the third linkage 16C in all directions, i.e. upward and downward as well as into and out of the paper. The handle 100 can also pivot relative to the seventh linkage 16G in a similar manner, i.e. upward and downward and into and out of the paper. By moving the second portions 72 of the third and seventh linkages 16C and 16G in three dimensions, the handle 100 can be moved in three dimensions. Moreover, the handle can be rotated about a vertical axis or an axis normal to the paper. Any combination of these movements is also possible. The handle 100 has an outer surface which is shaped to be held in a hand of a person. Forces and movement of the handle 100 can be transferred to a hand of the person. The person can also move the handle, thereby rotating the spindles and shafts of the subsystems 10A and 10B, so providing system feedback.

Figure 3:
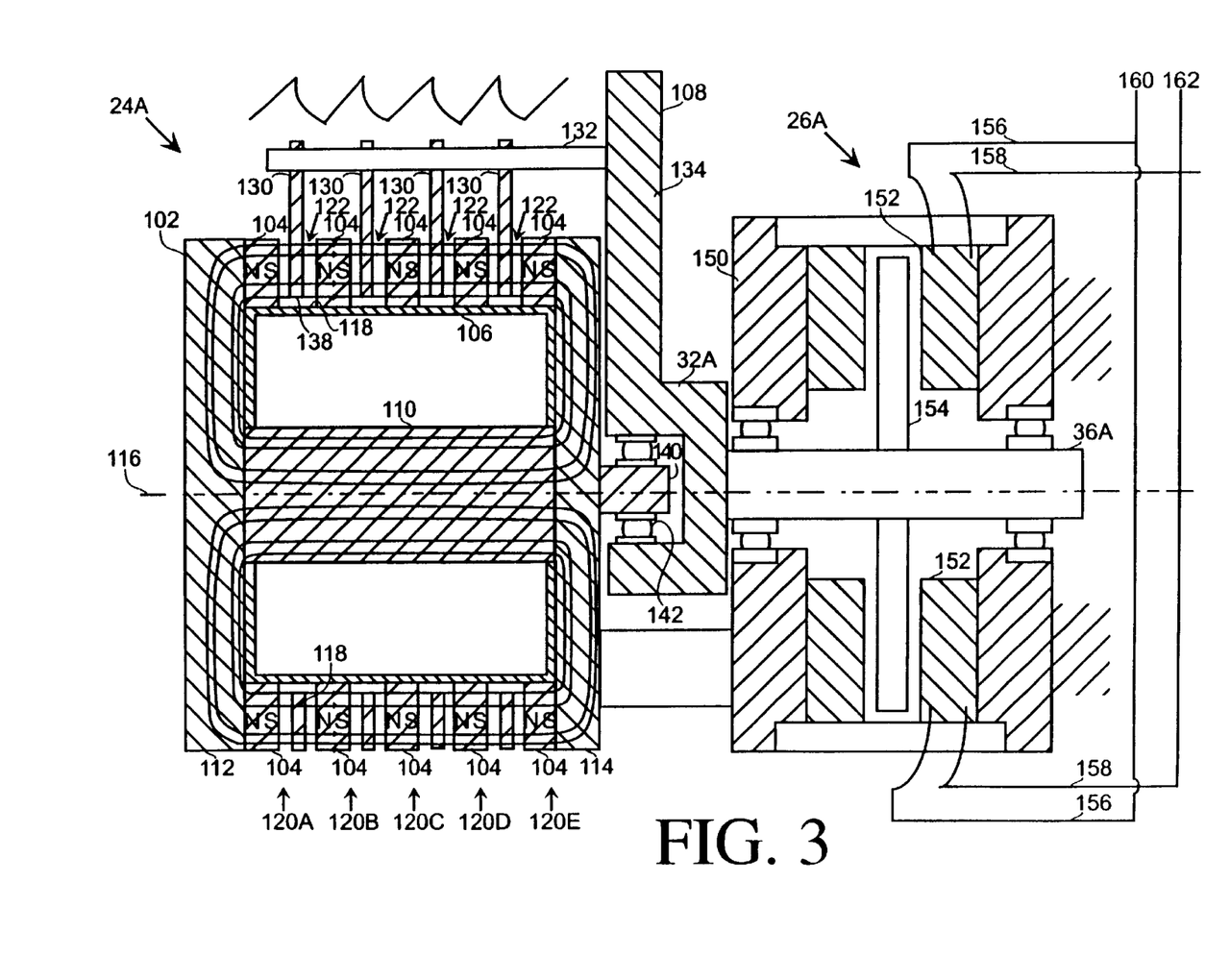
FIG. 3 is a cross-sectional side view of one motor and one brake of the actuation device.

FIG. 3 is a cross-sectional side view illustrating the motor 24A and the brake 26A. The motor 24A and the brake 26A are shown by way of example. All the motors in FIG. 2 are the same and all the brakes in FIG. 2 are the same, although this is not a requirement of the invention.

The motor 24A includes a housing 102, a plurality of stator magnets 104, a magnet support 106, and a rotor 108.

The housing 102 includes a magnetically conductive core 110 and first and second magnetically conductive end portions 112 and 114 respectively. The core 110 has a longitudinal axis 116. The magnet support 106 is made of a non-magnetic material such as aluminum or plastic. The magnet support 106 has a circular outer surface 118, and an opening therethrough through which the core 110 is inserted. The magnets 104 are secured to the surface 118.

The first and second end portions 102 are secured to opposing sides of the core 110. Each end portion 112 or 114 has a central axis coinciding with the axis 116. Each end portion 112 or 114 has a diameter which is larger than the outside of magnet support 106 so that outer edges thereof extend radially outwardly past the magnets 104.

Figure 4:
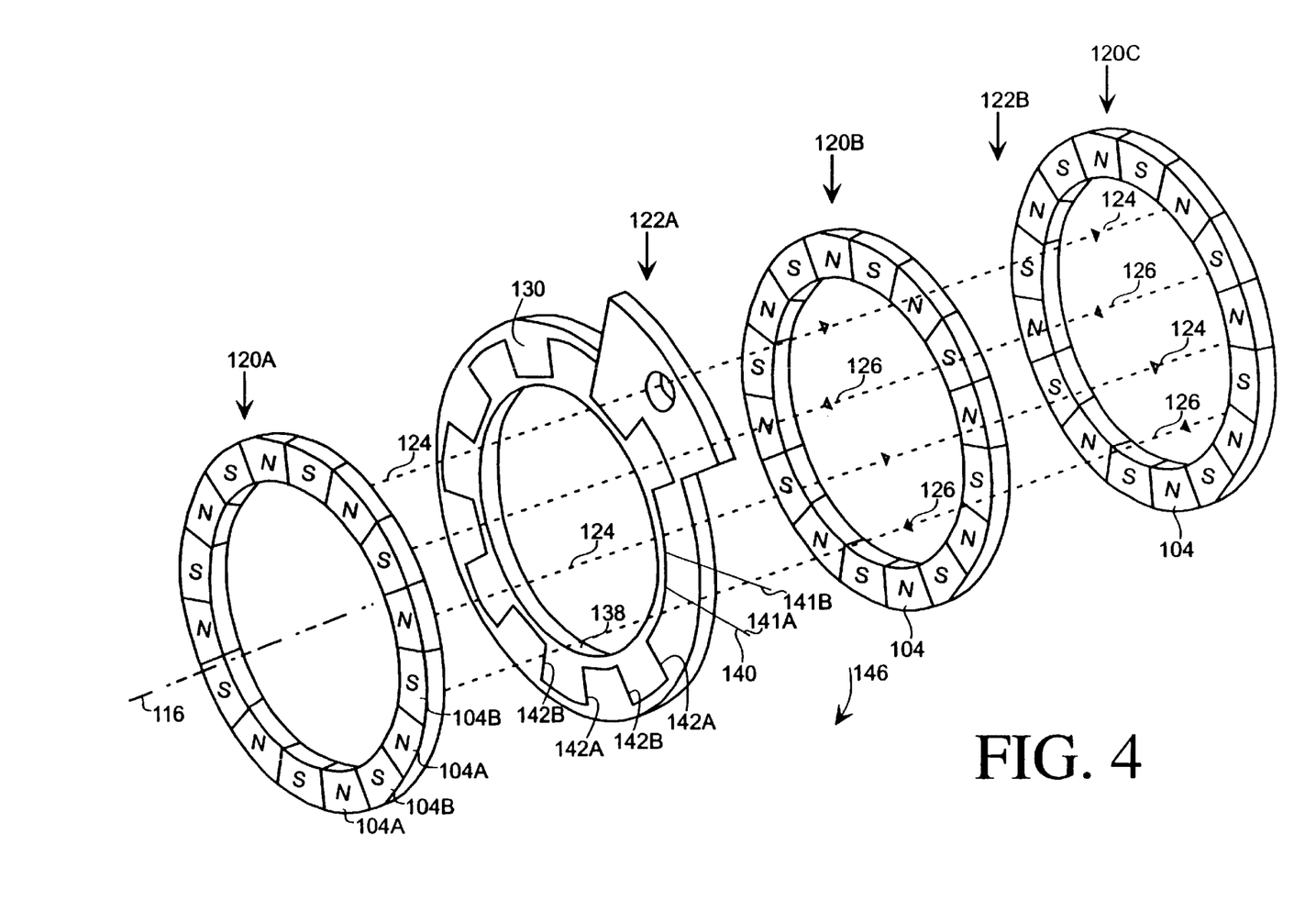
FIG. 4 is a perspective view of stator magnets and one rotor component of the motor shown in FIG. 3.

As can be seen in FIG. 4, the magnets 104 are located in a plurality of circular arrangements 120A, 120B, and 120C. Each circular arrangement 120A, 120B, or 120C has a circular row of the magnets. In a particular arrangement, for example the arrangement 120A, every odd magnet 104A has north on a first side and south on a second, axially opposing side thereof. Every even magnet has south on the first side and north on the second side.

The second arrangement 120B is axially spaced from the first arrangement 120A and the third arrangement 120C is axially spaced from the second arrangement 120B. A first rotor gap 122A is defined between the first arrangement 120A and the second arrangement 120B. A second rotor gap 122B is defined between the second arrangement 120B and the third arrangement 120C. The arrangements, 120A, 120B, and 120C are aligned with one another such that magnetic fields lines 124 are formed in one direction from a south side of odd magnets of the first arrangement 120A to a north side of odd magnets of the second arrangement 120B, and from a south side of odd magnets of the second arrangement 120B to a north side of odd magnets of the third arrangement 120C. Magnetic field lines 126 form in a opposite direction from a south side of even magnets of the third arrangement 120C to a north side of even magnets of the second arrangement 120B, and from a south side of even magnets of the second arrangement 120B to a north side of even magnets of the first arrangement 120B. A respective field line 124 or 126 is formed across a respective one of the rotor gaps 122A or 122B.

The magnets 104 are electromagnets. Each magnet includes a coil through which a current can be provided to magnetize the coil. A magnetic field is created having magnetic field lines sequentially through the arrangements 120A, B, C, D and E, whereafter the magnetic field lines return through the second portion 114, the core 110, and the first portion 112 to the magnets of the first arrangement 120A.

Referring again to FIG. 3, the rotor 108 includes a plurality of rotor components 130, a link 132, and an arm 134.

Each rotor component 130 is a planar member which in the preferred embodiment is made from a printed circuit board for low cost. The rotor component 130 has a central opening 138 which is located over the outer surface 118 of the attenuator 106. Each rotor component 130 is located within a respective rotor gap 122. A portion of each rotor component 130 also extends out of the respective rotor gap 122 and is located externally of the magnets 104. The link 132 is inserted through openings in the portions of the rotor components 130 located externally of the magnets 104. The rotor components 130 are thereby mounted to one another.

A pin 140 is secured to the second portion 114 of the housing 102. A ball bearing 142 is located on an outer surface of the pin 140. A lower end of the arm 142 has a recess 144 therein located over the ball bearing 142. The arm is thereby mounted to the pin 142 for rotation about the axis 116. The link 132 is secured to an upper end of the arm 134. All the components of the rotor 108 are thereby mounted to the housing 102 for rotation about the axis 116. In the embodiment shown, the link 132 is located externally to and rotates about the magnets 104.

FIG. 4 shows one of the rotor components 130. A respective electrical conductor 140A is formed on each rotor component 130. The conductor 140A is made of copper and has two terminals 141A and 141B over which a voltage can be applied so that a current flows therethrough. The conductor could also be made of aluminum so as to decrease the rotational inertia of rotor 130, although aluminum has a substantially higher resistance than copper and would require additional power. The conductor 140A includes a plurality of sections 142. The sections 142 include odd sections 142A alternated by even sections 142B located in series.

When a current flows into one end of the conductor 140, the current flows radially outwardly through all the odd sections and radially inwardly through all the even sections. A current through an odd section 142A in combination with a magnetic field represented by line 124 causes a force on the respective odd section 142A which causes rotation of the odd section 142A in a direction 146 about the axis 116. The current through a respective even section 142B in combination with a magnetic field line 126 causes a force on the respective even section 142B which also causes rotation in the direction 146 about the axis 116. Utilizing a commutator (not shown in FIG. 4) the current can be reversed when the odd sections 142A are located in the magnetic field lines 126 and the even sections 142B are located in the magnetic field lines 124. As such, rotation in the direction 146 will be maintained. The current is again reversed when the odd sections 142A are located in the magnetic field lines 124, and so on.

An advantage of the motor 24A is that there is no "cogging" torque (the steps that one feels when rotating a spindle) because there is no steel or similar ferrous material in the rotor components 130 that may tend to line up with magnets. A user, when providing system feedback, will accordingly, not feel any cogging of the rotor components 130. Since the rotor components 130 are nonmagnetic, it has the disadvantage that magnetic fields lose substantial strength traveling through them just as if they were traveling through air. However, this disadvantage is overcome by making the rotor components 130 thin and making the rotor gaps 122 very small. An additional advantage of the thin rotor components 130 is a low rotational inertia. Another advantage is that more torque can be generated for its size because the magnetic field is continually reused by passing it through multiple rotors, thereby multiplying the torque generated by a single rotor. The magnetic return path created by housing 102, housing 114, and core 110 is shared by all of the rotors, instead of each rotor using a separate return path.

Figure 5:
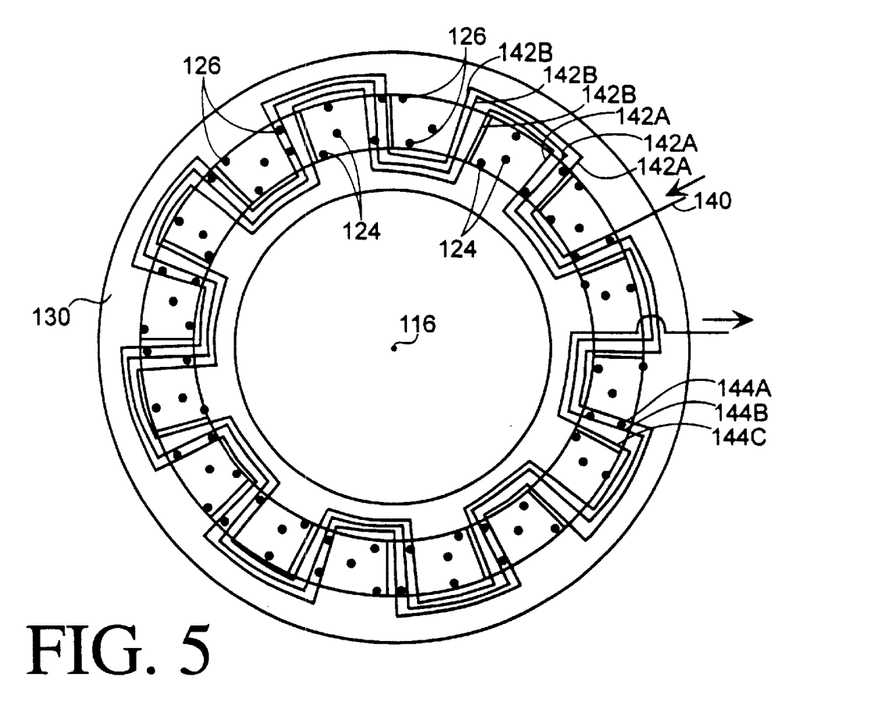
FIG. 5 is a front view of the rotor component, illustrating one conductor thereon in more detail.

FIG. 5 now illustrates the first conductor 140A in more detail. The conductor 140A has a plurality of turns 144A, 144B, and 144C in series about the axis 116. Each turn has a plurality of odd sections 142A initially carrying current radially outward while a plurality of even sections 142B carry current radially inward. All the odd sections 142A are initially located in the odd magnetic field lines 124 while all the even sections 142B are located in the even magnetic field lines 126.

In the example illustrated, there are eight magnetic fields represented by the odd magnetic field lines 124 and eight magnetic fields represented by the even magnetic field lines 126. The odd sections 142A of successive turns 144A, 144B, and 144C located in the same magnetic field are angularly spaced from one another. Because of angular spacing of the sections, a thinner rotor component 130 is provided than would be the case should the sections be axially spaced. A thinner rotor component 130 contributes greatly to propagation of magnetic field, especially in the absence of a magnetic material such as steel.

Figure 6:
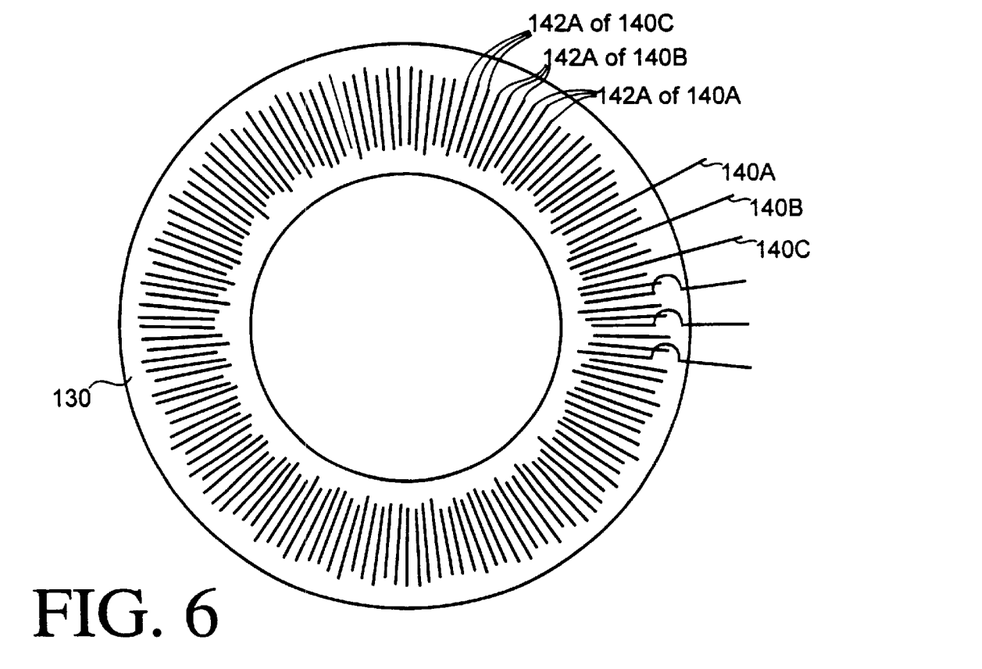
FIG. 6 is a front view of the rotor component illustrating sections of three conductors, each carrying a separate phase of current, uniformly spaced thereon.

FIG. 6 illustrates the sections 142A and 142B of the first conductor 140A and further illustrates sections 142A and 142B of two more first conductors 140B and 140C secured to the rotor component 130. Each conductor 140A, 140B, and 140C is distinct from the other and has a respective terminal to which, in use, a separate phase of power is applied. Odd sections 142A of all the conductors 140A, 140B, and 140C are located in the magnetic fields represented by the odd magnetic field lines 124. The odd sections of the conductor 140B located in the same magnetic field as odd sections of the conductor 140A are angularly spaced from the odd sections of the conductor 140A.

Figure 7:
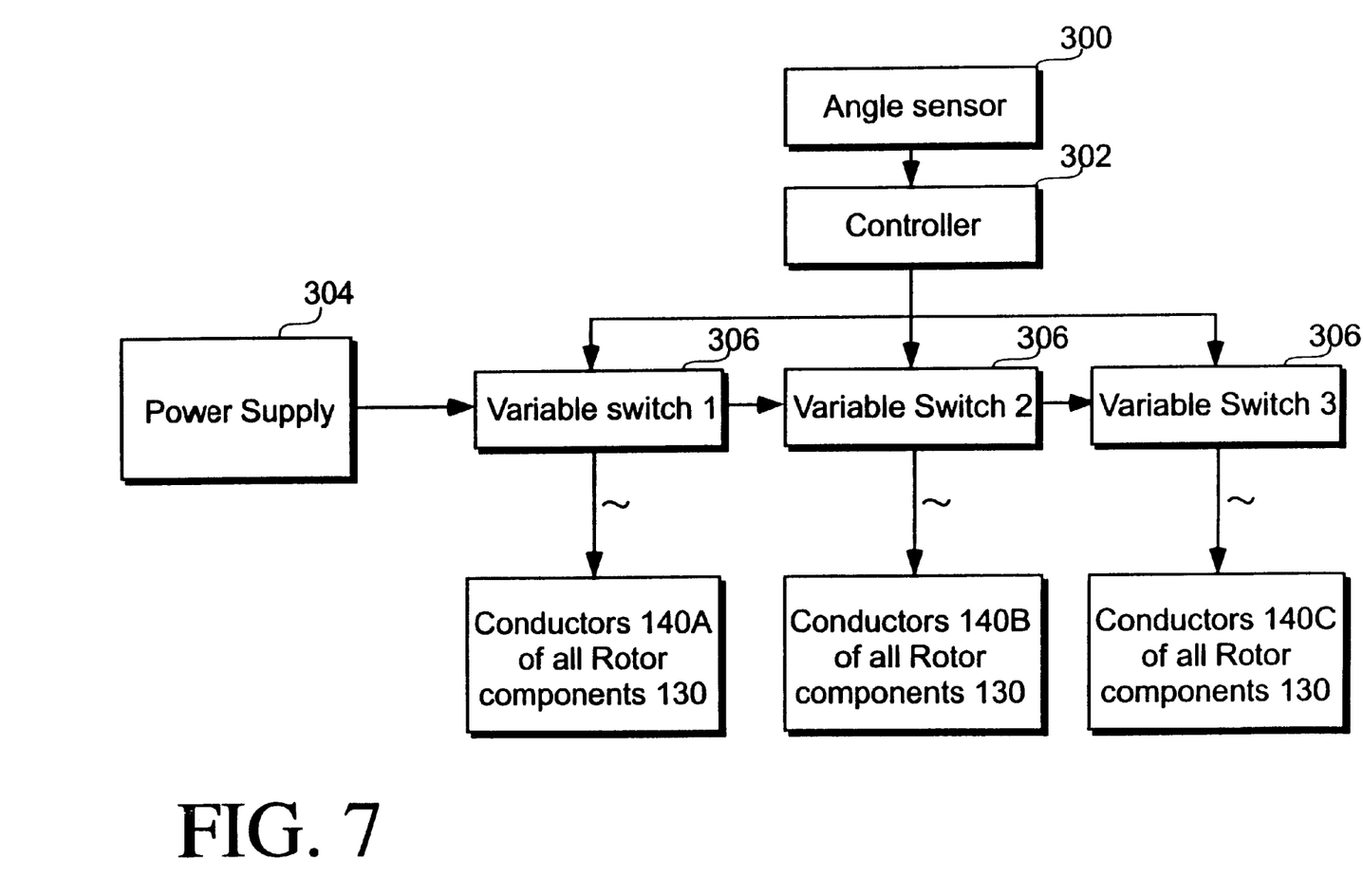
FIG. 7 is a block diagram illustrating components to commutate current to the conductors.

FIG. 7 illustrates components used to commutate power supplied to the conductors 140 of the motor 24A. The components include an angle sensor 300, a controller 302, a power supply 304, and three variable switches 306. The power supply 304 supplies a voltage to all the variable switches 306. Each switch 306 is independently controlled by the controller 302. The angle sensor 300 detects an angular position of the rotor 108 and provides a signal indicative of the angular position to the controller 302. The controller 302 switches each switched sixteen times (equivalent to the number of magnetic fields or the number of magnets 104 in an arrangement 120) during one revolution of the rotor. The phases of the switches lag behind one another by their angular displacement, i.e. by $\frac{1}{48}$ of a revolution of the rotor. Each switch 306 is controlled so as to provide a sinusoidal voltage to the respective conductors 140A, 140B, or 140C forty-eight times during a revolution of the rotor 108.

The brake 26A shown in FIG. 3 is a hysteresis brake that includes a housing 150, a plurality of electromagnets 152, the shaft 36A, and a rotor 154. The rotor 154 has a plurality of magnets (not shown) located in a circular arrangement thereon. Electric conductors 156 and 158 are connected to coils of the electromagnets 152. Each electric conductor 156 and 158 is connected to a respective terminal 160 and 162. A voltage can be applied over the terminals 160 and 162 so that a current flows in a respective one of the coils of the electromagnets 152. The electromagnets 152 are thereby magnetized. Moreover, the voltage over the terminals 160 and 162 can be varied so as to vary the strength of magnetization of the electromagnets 152.

The rotor 154 is secured to the shaft 46A and can rotate freely when the electromagnets 152 are not magnetized. There is then no torque which prevents rotation of the rotor 154. An increase in magnetization of the electromagnets 152 creates a resistance which resists rotation of the rotor 154. The spindle 32A is formed on the arm 34 of the motor 24A and the spindle 32A is connected to the shaft 36A. Any movement imparted on the shaft 36A by the motor 24A can be braked by applying a voltage over the terminals 160 and 162. The braking torque can be varied by varying the voltage over the terminals 160 and 162.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

For example, the rotor 108 includes a plurality of planar rotor components 130. Another embodiment may have a planar disk rotor including an outer disk rotor component and an inner disk rotor component, the rotor components thus being concentrically located, one within the other. Such an arrangement could use magnet arrangements located concentrically within one another.

Another embodiment could use magnet arrangements located concentrically within one another and being radially polarized. A respective cylindrical rotor component could be inserted in a respective rotor gap between a respective outer and a respective inner magnet arrangement.

Utilizing concentric rings of magnets have the disadvantage of large flux density changes. In the present embodiment, the flux density remains relatively constant through all the rotor components.

The present embodiment also utilized universal joints that have the advantage that they are less expensive to manufacture than, for example, constant-velocity joints. Constant-velocity joints, by contrast, have the advantage that they do not cause the typical 1–3% variation in angular velocity associated with universal joints. However, the change in velocity of the universal joints can be compensated for by a control system controlling the rotation speed of the motors.

Furthermore, the present invention utilizes electromagnets because of better performance. Permanent magnets could alternatively be used to reduce cost and/or power consumption.

It is also possible to construct the invention without brakes 20A, 20B, 20C, 20D, 26A and 26B when large braking forces (compared to the necessary actuation forces) are not required.

It is also possible to construct the invention by eliminating one paired motor and brake subsystem 18A and 20A, 18B and 20B, 18C and 20C, or 18D and 20D.

What is claimed:

1. An actuation device comprising:

a support frame;

first, second third and fourth linkages, each having first and second spaced apart portions, the first portions of the first and second linkages being secured to the support frame for pivotal movement about first and second spaced apart pivot axes, respectively, and for rotational movement about a common first rotation axis transverse to the first and second pivot axes, the first portions of the third and fourth linkages being secured to the second portions of the first and second linkages for pivotal movement about third and fourth pivot axes, respectively, the second portions of the third and fourth linkages being secured to one another for pivotal movement about a fifth pivot axis;

a user interface component secured to the second portion of one of the third linkage and the fourth linkage, the user interface component having a surface shaped for contact by a body part of a person; and a first rotation actuator having a first rotation actuator body and a first rotation actuating component secured to the first rotation actuator body, the first rotation actuator being connected between the frame and the first linkage such that movement of the first rotation actuating component causes rotation of the first, second, third, and fourth linkages about the first rotation axis.

2. The actuation device of claim 1 wherein the first rotation actuator has a terminal the first rotation actuating component being moved relative to the first rotation actuator body when a voltage on the terminal is changed.

3. The actuation device of claim 1 further comprising:

a first rotation break providing resistance against rotation of the first, second third, and fourth linkages about the rotation axis, the break having a terminal, a magnitude of the resistance being altered upon a change in voltage on the terminal.

4. The actuation device of claim 1 wherein the first rotation actuating component is actuable to rotate relative to the first rotation actuator body about the rotation axis to rotate the first, second, third, and fourth linkages.

5. The actuation device of claim 1 wherein the first rotation actuator body has a higher mass than the first rotation actuating component.

6. The actuation device of claim 1 further comprising:

a first universal joint coupling the first linkage to the frame and allowing for the pivotal and the rotational movement of the first linkage; and a second universal joint coupling the second linkage to the frame and allowing for the pivotal and the rotational movement of the second linkage.

7. The actuation device of claim 6 further comprising:

a bracket connected to the frame and being rotatable about the first rotation axis, the first rotating actuating component being connected to the bracket to rotate the bracket about the first rotation axis, the first linkage being connected to the bracket so that the bracket, upon rotation thereof, rotates the first linkage about the rotation axis, the bracket allowing for pivoting of the first linkage about the first pivot axis.

8. The actuation device of claim 1 further comprising:

a first pivoting actuator having a first pivoting actuator body and a first pivoting actuating component secured to the first pivoting actuator body and being actuable to move relative to the first pivoting actuator body such that movement of the first pivoting actuating component causes pivoting of the first linkage about the first pivot axis; and a second pivoting actuator having a second pivoting actuator body and a second pivoting actuating component secured to the second pivoting actuator body and being actuable to move relative to the second pivoting actuator body such that movement of the second pivoting actuating component causes pivoting of the second linkage about the second pivot axis.

9. The actuation device of claim 8 wherein each pivoting actuator has a terminal, the pivoting actuating component thereof being moved relative to the pivoting actuator body thereof when a voltage on the respective terminal is chanced.

10. The actuation device of claim 8 further comprising:

a first pivoting break providing resistance against pivoting of the first linkage about the first pivot axis, the first pivoting break having a terminal, a magnitude of the resistance being altered upon a change in voltage on the terminal thereof; and a second pivoting break providing resistance against pivoting of the second linkage about the second pivot axis, the second pivoting break having a terminal, a magnitude of the resistance being altered upon a change in voltage on the terminal thereof.

11. The actuation device of claim 8 wherein the first pivoting actuating component is actuable to rotate relative to the first pivoting actuator body about the first pivoting axis to pivot the first linkage, and the second pivoting actuating component is actuable to rotate relative to the second pivoting actuator body about the second pivoting axis to pivot the second linkage.

12. The actuation device of claim 8 wherein the first and second pivoting actuator bodies are mounted to the frame and the first and second pivoting actuating components are secured to the first and second linkages respectively, the first pivoting actuator body has a higher mass than the first pivoting actuating component and the second pivoting actuator body has a higher mass than the second pivoting actuating component.

13. The actuation device of claim 1 further comprising:

fifth, sixth, seventh, and eighth linkages, each having first and second spaced apart portions, the first portions of the fifth and sixth linkages being secured to the frame for pivotal movement about sixth and seventh pivot axes, respectively, and for rotational movement about a common second rotation axis transverse to the sixth and seventh and eighth linkages being secured to the second portions of the fifth and sixth linkages for pivotal movement about eighth and ninth pivot axis, respectively, the second portions of the seventh and eighth linkages being secured to one another for pivotal movement about a tenth pivot axis, the user interface device having first and second spaced apart portions, the first potion thereof being pivotally secured to the second portion of one of the third and fourth linkages and the second portion thereof being pivotally secured to the second portion of one of the seventh and eighth linkages;

a second rotation actuator having a second rotation actuator body and a second rotation actuating component secured to the second rotation actuator body and being actuable to move relative to the second rotation actuator body, the second rotation actuator being connected between the frame and the sixth linkage such that movement of the second rotation actuation component causes rotation of the fifth to the eighth linkages about the second rotation axis; and a second pivoting actuator having a second pivoting actuator body and a second pivoting actuating component secured to the second pivoting actuator body and being actuable to move relative to the second pivoting actuator body so as to pivot the fifth linkage about the sixth pivot axis.

14. The actuation device of claim 13 wherein the first and second rotation axes coincide.

15. The actuation device of claim 1 wherein the user interface device is a handle and the surface is shaped to be held in a hand of the person.

16. An actuation device comprising:

a support frame;

first, second, third, and fourth linkages, each having first and second spaced apart portions, the first portions of the first and second linkages being secured to the support frame for pivotal movement about first and second pivot axes, respectively, the third and fourth linkages being secured to the second portions of the first and second linkages for pivotal movement about third and fourth pivot axes, respectively, the second portions of the third and fourth linkages being secured to one another for pivotal movement about a fifth pivot axis;

a user interface component secured to the second portion of one of the third linkage and the fourth linkage, the user interface component having a surface shaped for contact by a body part of a person;

a first pivoting actuator having a first pivoting actuator body and a first pivoting actuating component secured to the first pivoting actuator body, having a lower mass than the first pivoting actuator body, and being actuable to move relative to the first pivoting actuator body, the first pivoting actuator body being secured to the frame and the first pivoting actuating component being secured to the first linkage such that movement of the first pivoting actuating component causes pivoting of the first linkage about the first pivot axis.

17. The actuation device of claim 12 further comprising:

a second pivoting actuator having a second pivoting actuator body and a second pivoting actuating component secured to the second pivoting actuator body, having a lower mass than the second pivoting actuator body, and being actuable to move relative to the second pivoting actuator body, the second pivoting actuator body being secured to the frame and the second pivoting actuating component being secured to the second linkage such that movement of the second pivoting actuating component causes pivoting of the second linkage about the second pivot axis.

18. The actuation device of claim 17 wherein the first and second pivot axes are spaced apart.

* * * * *